United States Patent [19]

McKay

[11] 4,141,858
[45] Feb. 27, 1979

[54] PASSIVATING METALS ON CRACKING CATALYSTS

[75] Inventor: Dwight L. McKay, Bartlesville, Okla.

[73] Assignee: Phillips Petroleum Company, Bartlesville, Okla.

[21] Appl. No.: 819,027

[22] Filed: Jul. 26, 1977

Related U.S. Application Data

[63] Continuation-in-part of Ser. No. 671,231, Mar. 29, 1976, abandoned.

[51] Int. Cl.$^2$ .................. B01J 27/02; B01J 27/14
[52] U.S. Cl. .................................. 252/439; 252/437; 252/456; 208/120
[58] Field of Search .................. 252/439, 411 R, 456, 252/464, 437; 208/113–120

[56] References Cited

U.S. PATENT DOCUMENTS

| 2,645,605 | 7/1953 | Lang et al. ................ 252/464 X |
| 3,417,157 | 12/1968 | Pollitzer ...................... 252/456 X |
| 3,711,422 | 1/1973 | Johnson et al. ............... 252/414 |
| 3,977,963 | 8/1976 | Readal et al. ................. 208/120 |
| 4,025,458 | 5/1977 | McKay ........................... 252/416 |

Primary Examiner—Carl Dees

[57] ABSTRACT

Metals such as nickel, vanadium and iron contaminating a cracking catalyst are passivated by contacting the cracking catalyst under elevated temperature conditions with antimony selenide, antimony sulfide, antimony sulfate, bismuth selenide, bismuth sulfide, or bismuth phosphate.

9 Claims, No Drawings

PASSIVATING METALS ON CRACKING CATALYSTS

This is a continuation-in-part application of my co-pending patent application Ser. No. 671,231 filed Mar. 29, 1976 and now abandoned.

The present invention relates to the art of catalytic cracking of hydrocarbons. More specifically the invention relates to the restoration of used cracking catalysts. In accordance with another aspect, this invention relates to modified cracking catalysts. Particularly, the invention relates to the passivation of contaminating metals on cracking catalysts.

BACKGROUND OF THE INVENTION

Hydrocarbon feedstock containing higher molecular weight hydrocarbons is cracked by contacting it under elevated temperatures with a cracking catalyst whereby light distillates such as gasoline are produced. However, the cracking catalyst gradually deteriorates during this process. One source for this deterioration is the deposition of contaminating metals such as nickel, vanadium and iron on the catalyst which increase the production of hydrogen and coke. At the same time the conversion of hydrocarbons into gasoline is reduced by these metals. It would, therefore, be desirable to have a modified cracking catalyst available, the modifying agent of which passivates those undesirable metal deposits on the cracking catalyst.

THE INVENTION

It is thus one object of this invention to provide a process for the passivation of contaminating metals deposited on cracking catalysts.

A further object of this invention is to provide a process for the restoration of a used cracking catalyst.

Still another object of this invention is to provide an improved catalytic cracking process.

A further object of this invention is to provide a modified cracking catalyst.

Still a further object of this invention is to provide a cracking process with high yield and selectivity for gasoline.

Further objects, embodiments, advantages, features and details of this invention will become apparent to those skilled in the art from the following detailed description of the invention and the appended claims.

Yet another object of this invention is to provide passivating agents with specific efficiencies in one or more of the four features of reducing hydrogen production, reducing coke production, icreasing gasoline production and increasing catalyst activity.

In accordance with this invention, I have now found that metals selected from the group consisting of nickel, iron and vanadium deactivating a cracking catalyst can be passivated by contacting this catalyst with at least one compound selected from the group consisting of antimony selenide, antimony sulfide, antimony sulfate, bismuth selenide, bismuth sulfide and bismuth phosphate. Although the antimony or bismuth in each of these compounds as employed in the passivation of the metals-contaminated catalyst preferably is in the trivalent state, such compounds in which the antimony or bismuth is in a higher valence state can be used when available. This modifying treatment increases catalyst activity, increases yield of gasoline, decreases production of coke, and/or decreases production of hydrogen in a cracking process as compared to the unmodified catalyst.

In accordance with one embodiment of this invention, a cracking catalyst is provided that has been prepared by contacting a clay based cracking catalyst with said compound under elevated temperature conditions.

In accordance with a still further and preferred embodiment of this invention, the modified catalyst of this invention is one that has been prepared by contacting a clay based cracking catalyst with a passivating compound being one of the compounds antimony selenide, antimony sulfide, antimony sulfate, bismuth selenide, bismuth sulfide and bismuth phosphate, preferably under reducing conditions. Depending upon which one of the modifying or passivating compositions of antimony or bismuth is used, a specific effect can be achieved. It has surprisingly been found that the individual compositions have a different passivating behavior although some of them are structurally-chemically rather closely related. Thus for reducing the hydrogen production in a cracking process a passivating composition selected from the group consisting of antimony selenide, antimony sulfide, antimony sulfate, bismuth phosphate, and bismuth selenide is preferably used in the passivating process described and in the cracking process to be described; for increasing the gasoline production a passivating compound selected from the group consisting of antimony selenide, antimony sulfide, antimony sulfate, bismuth sulfide and bismuth phosphate preferably is utilized; in operations in which the coke production constitutes a problem, e.g. because of limited air blower capacity at the regenerator or because heavier feedstocks are intended to be used creating an increased coke problem in the cracking operation, passivating compounds selected from the group consisting of antimony selenide, antimony sulfide and antimony sulfate are preferably used; the compounds anitmony selenide, antimony sulfate, bismuth phosphate, bismuth sulfide and bismuth selenide advantageously restoe catalyst activity, i.e. significantly reduce the catalyst-to-oil ratio necessary to achieve a given conversion level as compared to a non-treated cracking catalyst deactivated by e.g. nickel or vanadium; the last mentioned group of compounds therefore is preferred in order to mainly improve catalyst activity. Thus, among all of these inorganic antimomy and bismuth compounds, the group consisting of antimony selenide ($Sb_2Se_3$), anitmony sulfide ($Sb_2S_3$), anitmony sulfate ($Sb_2(SO_4)_3$) and bismuth phosphate ($BiPO_4$) is preferred, antimony selenide and antimony sulfate being the most preferred passivating agents in the group. For the reducing conditions, it is particularly preferred to employ a fluidizing hydrogen containing medium in contact with the clay based cracking catalyst and the passivating compound. To achieve the surprising advantages of this embodiment of the invention, it is preferred to have the reducing conditions prevailing when the clay based catalyst/passivating compound mixture is subjected to high temperatures for the first time. This initial treatment under elevated temperature conditions and in reducing surroundings generates a modification of the cracking catalyst that is not destroyed by subsequent regenerations or oxygen heat treatments. In this embodiment it is most preferred to contact the clay based cracking catalyst contaminated with metals such as nickel, vanadium and iron with the passivating compound under elevated temperatures and under reducing conditions.

The term "clay based catalyst" can be any of those cracking catalysts conventionally employed in the catalytic cracking of hydrocarbons boiling above 400° F (204° C) for the production of gasoline, motor fuel, blending components and light distillates; this cracking procedure is carried out in the absence of added hydrogen. The conventional cracking catalysts generally contain silica, or silica-alumina. Such materials are frequently associated with zeolitic materials. These zeolitic materials can be naturally occurring, or they can be produced by conventional ion exchange methods such as to provide metallic ions which improve the activity of the catalyst. The zeolite-modified silica-alumina catalysts are particularly applicable in the present invention. Examples of catalysts that can be used in the process of this invention include hydrocarbon cracking catalysts obtained by admixing an inorganic oxide gel with an aluminosilicate and aluminosilicate compositions which are strongly acidic as a result of treatment with a fluid medium containing at least one rare earth metal cation and a hydrogen ion, or ions capable of conversion to a hydrogen ion. Other cracking catalysts useful in the process of the present invention include crystalline and aluminosilicate zeolites having the mordenite crystal structure. The cracking catalyst as a fresh catalytic material will generally be in particulate form having a particle size principally within the range of about 10 to about 200 microns.

The modified catalyst of this invention consists essentially of a conventional clay based cracking catalyst with a small amount of a passivating compound selected from the group consisting of antimony selenide, antimony sulfide, antimony sulfate, bismuth selenide, bismuth sulfide and bismuth phosphate. The quantity of passivating compound is prefreably such that about 0.05 to about 5 wt. % of antimony or bismuth is deposited on the catalyst, this percentage being based on the weight of the clay based carcking catalyst prior to treatment with the passivating compound.

The catalyst in accordance with a further embodiment of this invention is obtained by mixing the clay based cracking catalyst with a finely divided passivating compound selected from the group consisting of antimony selenide, antimony sulfide, antimony sulfate, bismuth selenide, bismuth sulfide and bismuth phosphate powder and subjecting this mixture to an elevated temperature. This temperature is generally in the range of about 800° F (427° C) to about 1500° F (816° C). The finely divided passivating compound powder preferably is of such a particle size as to pass through a Tyler Standard Screen of about 150 mesh or finer. The passivating compound particles can have a diameter of about 0.1 to 0.03 mm. Smaller particles can be used.

The mixing of the clay based cracking catalyst with the passivating compound can be achieved in any conventional manner such as rolling, shaking, stirring, etc. It is, however, presently preferred to mix the clay based catalyst and the passivating compound by adding the passivating agent either to a stream of catalyst in the cracking unit or preferably to the hydrocarbon feed stream entering the cracker. The passivating agent can be employed in anhydrous form or as a hydrate, when desired.

When antimony triselenide is employed, particularly advantageous results, surprisingly high yields of gasoline, and surprisingly low butadiene contents of the cracker effluent are obtained when the initial contacting between the metals-contaminated clay based cracking catalyst and antimony triselenide is achieved under reducing conditions. These reducing conditions preferably are either the presence of a free hydrogen-containing gas in contact with the catalyst/$Sb_2Se_3$ mixture or the conditions of the cracking reaction itself. Thus the antimony triselenide, in accordance with a preferred embodiment of this invention, is added to the hydrocarbon feed stream entering the cracker.

In accrodance with a further embodiment of this invention, there is provided a process for restoring cracking catalysts by passivating contaminating metals selected from the group consisting of nickel, vanadium and iron, which process comprises the step of contacting the contaminated clay based cracking catalyst with an antimony or bismuth compound selected from antimony selenide, antimony sulfide, antimony sulfate, bismuth selenide, bismuth sulfide and bismuth phosphate under elevated temperature and reducing conditions. The preferred temperature, particle size, and concentration conditions disclosed above apply to this process as well. It is presently preferred to contact cracking catalyst on which a deactivating amount of the contaminating metals has been deposited with antimony selenide or antimony sulfate.

The hydrogen pressure employed in this process preferably is in the range of about 50 to 760 mm Hg when the treatments occur at atmospheric pressure as normally practiced.

The time during which the clay based catalyst is contacted with the passivating compound under elevated temperature conditions is not critical. Generally the time is in the range of about 1 minute to about 5 hours.

In accordance with still a further embodiment of this invention, there is provided a cracking process wherein hydrocarbon feedstock is contacted under cracking conditions with a modified clay based cracking catalyst which comprises a modifying amount of a passivating compound as defined above. For this embodiment, too, the preferred details concerning the modified cracking catalyst disclosed above apply also. Thus the preferred modified cracking catalyst is one that is obtained by mixing a clay based catalyst with the passivating compound, preferably with $Sb_2Se_3$ or $Sb_2(SO_4)_3$ powder, and subjecting the mixture to high temperature conditions. Most preferably the initial high temperature treatment of the cracking catalyst-passivating compound mixture is carried out under reducing conditions.

Advantageously and in accordance with still a further embodiment of this invention, the passivating compound is added to the feedstock entering the cracking zone in which it is contacted with cracking catalyst. By this procedure the contacting of the clay based cracking catalyst and the passivating compound and the initial treatment under elevated temperatures is done under reducing conditions prevailing in the catalytic cracker.

The cracking process of this invention is advantageouly carried out in such a manner that the catalyst is continuously circulated from the cracking zone to a regeneration zone and back to the cracking zone. In the regeneration zone, the spent deactivated catalyst is regenerated by burning off coke from the catalyst with a free oxygen-containing gas.

The main component of the modified catalyst of this invention is a clay based catalyst which is commercially available.

The cracking catalysts modified by the passivating treatment of this invention are synthetic or natural silica-alumina compositions containing from 0 to about 10 wt. % of other metal oxides. The cracking catalysts that can be treated in accordance with this invention are commercially available. The amounts of nickel and vanadium in the unused catalyst should be very small, i.e., less than about 0.05 wt. % and the iron content should be less than about 0.5 wt. % to prevent excessive coke and hydrogen formation in the cracking process. The alumina content can vary from about 10-70 wt. %, and the silica content can vary from about 90-30 wt. % in general. In addition, the catalyst can contain rare earth metals, such as cerium and lanthanum, magnesia, zirconia, boria or thoria.

It is presently preferred to use active clay based catalysts, however. The catalysts are produced from such clays as bentonites, halloysites and kaolinites. Treatments such as acid washing followed by water washing can be employed to improve catalytic activity of the clay. After such treatment, the clay based catalyst can be pelletized and calcined to produce the final product.

The catalysts are often associated with zeolitic materials and these materials can be ion exchanged to provide metal ions which influence the activity of the catalyst. Rare earth metals such as lanthanum, cerium, praseodymium, neodymium and the like and combinations thereof can be used for this purpose.

The surface area of the clay based cracking catalyst generally is about 70-200 m$^2$/g and the pore volume is around 0.3-0.4 ml/g.

The modifying or passivating compounds are commercially available from chemical supply firms. They can also be produced by known chemical reactions, e.g. by direct combination of stoichiometric amounts of the elements Sb and Se in an evacuated quartz tube to make $Sb_2Se_3$.

The feedstock utilized in the cracking process of this invention can be any feedstock usually employed for catalytic cracking. Generally speaking, feedstocks are petroleum or crude oil or products derived therefrom. The feedstocks generally are hydrocarbon mixtures having boiling points above the boiling point range of gasoline, i.e., boiling point ranges above about 400° F (about 200° C). These hydrocarbon mixtures include such fluids as gas oils, fuel oils, topped crudes and shale oils.

The invention will be still more fully understood from the following examples which are intended to illustrate preferred embodiments of this invention but not to limit the scope thereof.

EXAMPLE I

An active clay based cracking catalyst commercially available under the tradename F-1000 by the Filtrol Corporation had been used in a commercial cracking unit for cracking Borger (West Texas) topped crude oil. The properties and the metal contents of this catalyst before and after the use thereof are shown in the following table:

TABLE I

| Properties of New and Used Cracking Catalyst | | |
|---|---|---|
| Property | New | Used |
| Surface area, m$^2$/g | 200 | 74.3 |
| Pore volume, ml/g | 0.4 | 0.3 |
| Weight percent | | |
| $Al_2O_3$ | 40.0 | 39.27 |
| $SiO_2$ | 57.1 | 56.06 |
| Nickel | 0.01 | 0.38 |
| Vanadium | 0.03 | 0.62 |
| Iron | 0.36 | 0.94 |

TABLE I-continued

| Properties of New and Used Cracking Catalyst | | |
|---|---|---|
| Property | New | Used |
| Sodium | 0.27 | 0.41 |
| Potassium | 0.25 | 0.27 |
| Calcium | 0.16 | 0.28 |
| Lithium | <0.01 | <0.01 |
| Antimony | <0.015 | <0.015 |
| Cerium | 0.4 | 0.39 |
| Lanthanum | 1.4 | 1.37 |

The used active clay based catalyst was dried in a fluid bed with air at about 900° F (482° C) and divided into four samples 1, 2, 3 and 4. Sample 1 was not mixed with any additive. Samples 2 and 3 were both mixed with a sufficient quantity of antimony triselenide powder which passed through a 325 mesh screen to add 0.8 wt. % of antimony, calculated as the metal, to the catalyst. The catalyst sample 4, a comparison sample, was mixed with a sufficient quantity of antimony trioxide ($Sb_2O_3$) powder which passed through a 325 mesh screen to add 0.8 wt. % of antimony, calculated as a metal, to the catalyst.

Each one of the samples was placed into a laboratory-sized confined fluid bed reactor and purged with nitrogen. The samples then were heated to 1200° F (649° C) and maintained there 5 minutes in the presence of a fluidizing gas. This fluidizing gas in the case of samples 1, 3 and 4 was air, whereas the fluidizing gas in the case of sample 2 was hydrogen. Sample 2 thereafter was purged with nitrogen. Thereafter all four samples were contacted for 15 minutes with fluidizing air at 1200° F (649° C). Then all four samples were cooled to 950° F (510° C) by nitrogen purge.

All four samples then were used to crack Borger topped crude oil feed for 30 seconds at 950° F (510° C) (aging). Following this step each sample was purged with nitrogen. Then each sample was regenerated by contact with fluidizing air at 1200° F (649° C) for 30 minutes. Thereafter the temperature of the samples was adjusted to 1050° F (566° C) by fluidizing nitrogen gas. The regenerated catalyst samples were then used to crack Borger topped crude oil for a second time for 30 seconds at 1050° F (566° C) (test cracking). Thus each catalyst sample had been processed for an aging cycle and had been given one regeneration before it was used in the last mentioned test cracking step. The feedstock used in the cracking operations had an API gravity rating at 60° F (16° C) of 20.9, a pour point of 70° F (21° C) and a viscosity of 142 SUS at 210° F (99° C), which is equivalent to a Kinematic viscosity of 51.9 mm$^2$/s (cSt) at 99° C.

The cracked effluent of the test cracking from each reactor was analyzed and the results obtained are shown in the following table:

TABLE II

| Influence of Activating Conditions on Catalyst Performance | | | | |
|---|---|---|---|---|
| Catalyst Portion | Control 1 | Invention 2 | Comparison 3 | Comparison 4 |
| Activating medium | air | hydrogen | air | air |
| Treating agent | none | $Sb_2Se_3$ | $Sb_2Se_3$ | $Sb_2O_3$ |
| Catalyst/oil, wt. ratio | 7.03 | 6.95 | 7.03 | 7.10 |
| Conversion, vol. % of feed | 79.3 | 86.8 | 79.5 | 78.2 |
| Yields | | | | |
| Gasoline, vol. % of feed | 53.1 | 66.8 | 55.1 | 55.2 |
| Coke, wt. % of feed | 14.9 | 12.4 | 12.6 | 12.7 |
| Hydrogen, SCF/bbl converted | 655 | 364 | 625 | 535 |
| By-products, wt. % of | | | | |

TABLE II-continued
Influence of Activating Conditions on Catalyst Performance

| Catalyst Portion | Control 1 | Invention 2 | Comparison 3 | Comparison 4 |
|---|---|---|---|---|
| feed | | | | |
| $C_1$ | 1.09 | 1.30 | 1.75 | 1.59 |
| $C_2$ | 1.41 | 1.66 | 1.86 | 1.74 |
| $C_3$ | 0.82 | 1.06 | 1.20 | 1.10 |
| $C_3$(propylene) | 4.21 | 5.09 | 4.78 | 4.48 |
| $i-C_4$ (a) | 2.34 | 2.83 | 266 | 2.62 |
| $n-C_4$ | 0.57 | 0.72 | 0.73 | 0.68 |
| $C_4$ (olefins) | 5.69 | 6.30 | 5.64 | 5.30 |
| Butadiene in $C_4$ (olefins) cut, wt. % | 0.6(b) | 0.1 | 1.35 | 1.34 |
| Butadiene in total $C_4$ cut, wt. % | 0.45(b) | 0.1 | 0.86 | 0.84 |
| Total by-products, wt. % of feed | 16.13 | 18.96 | 18.62 | 17.51 |
| $C_4$ olefins to total by-products ratio | 0.34 | 0.33 | 0.30 | 0.30 |

(a) $H_2S$ is also in this chromatograph peak.
(b) Values read from smoothed curve (based on several tests made at identical conditions).

The results shown in Table II indicate that the yield achievable with the cracking clay based catalyst were considerably improved by contacting the catalyst with antimony triselenide as compared to the control run in which the catalyst has been contacted with no additive. The catalyst treated with antimony triselenide and initially heated with air caused a larger gasoline yield and smaller coke production than the untreated catalyst. Surprisingly the cracking catalyst treated with antimony triselenide and initially heat treated with hydrogen exhibited a considerably higher conversion rate than the catalyst treated with antimony triselenide but heated initially in air. Also the gasoline yield of the hydrogen activated catalyst was considerably larger than that of the air activated catalyst. Correspondingly, the hydrogen production of the hydrogen activated catalyst was much lower than that of the air activated catalyst. Furthermore, the butadiene content in the by-products was extremely small for the hydrogen activated catalyst as compared to the air activated catalyst, both treated with antimony triselenide.

EXAMPLE II

This calculated example is given to indicate how the invention can be operated in plant scale. In a commercial cracking unit containing 200 tons of active clay based catalyst, 24,300 bbl/day of oil having an API gravity of 20.8 are cracked. In order to build up a level of 0.5 wt. % (based on untreated cracking catalyst) of antimony of the cracking catalyst, antimony triselenide is added in a quantity of 20 ppm of antimony (286.9 pounds of antimony triselenide per day) to the feedstock for 17 days or of 30 ppm of antimony (430.4 pounds of antimony triselenide per day) to the feedstock for 10 days. In order to keep the antimony level at 0.5 wt. %, the rate of addition has to be 11 ppm of antimony (or 157.8 pounds of antimony triselenide per day) continuously in case 8 tons of catalyst per day are withdrawn from the reactor and replaced by untreated catalyst.

EXAMPLE III

Portions of the used cracking catalyst described in Table I were dry blended at room temperature (about 25° C) with the desired amount of antimony trisulfide (passed through a 325 mesh screen), antimony trisulfate (passed through a 325 mesh screen), bismuth sulfide (passed through a 325 mesh screen), bismuth selenide (passed through a 325 mesh screen), or bismuth phosphate trihydrate (passed through a 250 mesh screen). Each blend, as well as a sample of the used cracking catalyst without added antimony or bismuth compound, was placed in a laboratory-sized confined fluid bed reactor, and the reactor was then purged with nitrogen. The reactor was then purged with hydrogen, and each sample was heated to 1100°–1300° F (593°–704° C) while being fluidized with hydrogen, the temperature being maintained within this range for 0–30 minutes. The reactor was then purged with nitrogen, after which each sample at a temperature within the range of 1100°–1300° F (593°–704° C) was fluidized with air for about 15 minutes. The samples were then allowed to cool.

The above samples were used to crack Borger topped crude oil, described in Example I, by the procedure given in Example I except that the fluidization with nitrogen following the fluidization with air and the cracking step were conducted at 950° F (510° C) instead of 1050° F (566° C), and in some instances the aging cycle, including the regeneration step, was repeated at least once prior to obtaining the desired cracking data on which the summary in Table III is based. In Table III the values for gasoline, coke, and hydrogen production are based on values obtained by use of the catalyst previously treated with the modifying agent or passivating compound shown, the modified catalyst being evaluated at various conversion levels of oil feedstock by varying the catalyst:oil weight ratio. Based on the individual values for gasoline, coke, and hydrogen production at the various conversion levels, curves were drawn to represent the yields of these materials over a range of conversion levels, and from these curves the yields at 75 volume percent conversion were determined graphically. The yields shown in Table III represent these values determined at 75 volume percent conversion. Also shown in Table III are the values for catalyst:oil weight ratio at 75 volume percent conversion, these values having been obtained graphically from curves showing catalyst:oil weight ratios which provided oil feedstock conversion levels determined experimentally.

TABLE III
Effect of Passivating Compound on Cracking Catalyst Performance

| Passivating Compound | Sb or Bi, wt. %(a) | Catalyst:Oil Wt. Ratio | Yield Gasoline, Vol. % of Feed | Coke, Wt. % of Feed | Hydrogen, SCF/Bbl Feed Converted |
|---|---|---|---|---|---|
| None | 0.0 | 7.4 | 55.9 | 16.4 | 804 |
| $Sb_2S_3$ | 0.1 | 6.3 | 58.7 | 14.0 | 679 |
| $Sb_2S_3$ | 0.4 | 6.7 | 58.8 | 11.7 | 495 |
| $Sb_2S_3$ | 0.79 | 6.9 | 60.2 | 12.4 | 460 |
| $Sb_2S_3$ | 2.0 | 7.3 | 60.0 | 12.3 | 520 |
| $Sb_2(SO_4)_3$ | 0.1 | 6.5 | 62.1 | 13.3 | 498 |
| $Sb_2(SO_4)_3$ | 0.2 | 6.5 | 63.8 | 12.4 | 440 |

TABLE III-continued

Effect of Passivating Compound on Cracking Catalyst Performance

| Passivating Compound | Sb or Bi, wt. %(a) | Catalyst:Oil Wt. Ratio | Yield | | |
|---|---|---|---|---|---|
| | | | Gasoline, Vol. % of Feed | Coke, Wt. % of Feed | Hydrogen, SCF/Bbl Feed Converted |
| $Sb_2(SO_4)_3$ | 0.5 | 7.0 | 63.0 | 12.6 | 440 |
| $Sb_2(SO_4)_3$ | 0.8 | 6.0 | 62.3 | 11.8 | 405 |
| $Bi_2S_3$ | 0.094 | 6.4 | 57.5 | 15.0 | 828 |
| $Bi_2S_3$ | 0.8 | 5.1 | 61.6 | 14.8 | 782 |
| $Bi_2Se_3$ | 0.8 | 5.7 | 54.4 | 14.8 | 400 |
| $BiPO_4 \cdot 3H_2O$ | 0.1 | 6.1 | 55.9 | 14.1 | 510 |
| $BiPO_4 \cdot 3H_2O$ | 0.8 | 6.2 | 61.0 | 14.4 | 508 |

(a) Weight percent Sb or Bi, based on the weight of cracking catalyst prior to treatment with the modifying agent.

As shown in Table III, use of antimony trisulfide and antimony trisulfate at the levels employed resulted in increased yield of gasoline, decreased production of coke, and decreased production of hydrogen, compared with values obtained using the catalyst not treated with the passivating compound or modifying agent. Use of bismuth sulfide at the levels employed resulted in increased yield of gasoline and decreased production of coke. Use of bismuth selenide resulted in decreased production of coke and decreased production of hydrogen. Use of bismuth phosphate trihydrate at the levels employed resulted in decreased production of coke and decreased production of hydrogen, the yield of gasoline remaining the same or increasing. In all instances the catalyst which had been treated with a modifying agent was at least as active as the catalyst not treated with a modifying agent and usually was substantially more active.

Reasonable variations and modifications which will be apparent to those skilled in the art can be made in this invention without departing from the spirit and scope thereof.

I claim:

1. A modified cracking catalyst obtained by contacting a clay based cracking catalyst and at least one passivating compound selected from the group consisting of antimony selenide, antimony sulfide, antimony sulfate, bismuth selenide, bismuth sulfide and bismuth phosphate under elevated temperature conditions.

2. A catalyst in accordance with claim 1 obtained by contacting the clay based cracking catalyst with said passivating compound in an amount such as to add about 0.05 to about 5 weight percent antimony or bismuth, respectively, to the clay based cracking catalyst, said percent being based on the weight of the clay based cracking catalyst prior to treatment with the passivating compound.

3. A catalyst in accordance with claim 2 obtained by contacting the clay based cracking catalyst with antimony selenide at temperatures in the range of about 800° F to about 1500° F and under reducing conditions.

4. A catalyst in accordance with claim 2 obtained by contacting the clay based cracking catalyst on which a deactivating amount of at least one metal selected from the group consisting of nickel, iron and vanadium has been deposited with the passivating compound.

5. A catalyst in accordance with claim 2 obtained by contacting said clay based cracking catalyst with a compound selected from the group consisting an antimony selenide, antimony sulfide, antimony sulfate and bismuth phosphate.

6. A catalyst in accordance with claim 2 obtained by contacting said clay based cracking catalyst with antimony selenide.

7. A catalyst in accordance with claim 4 obtained by contacting and treating clay based catalyst and said compound under elevated temperature conditions in the presence of hydrogen.

8. A catalyst in accordance with claim 3 obtained by contacting a mixture of said clay based cracking catalyst and antimony selenide with hydrogen in the cracking zone.

9. A catalyst in accordance with claim 8 obtained by adding the antimony selenide to the hydrocarbon feedstock.

* * * * *